United States Patent
Arilla et al.

(10) Patent No.: US 8,297,404 B2
(45) Date of Patent: Oct. 30, 2012

(54) SOUNDPROOF EXHAUST PIPE FOR A TURBINE ENGINE

(75) Inventors: Jean-Baptiste Arilla, Lanne (FR); Pierre Michel Baude, Nay (FR); Stephane Didier Durand, Saint Vincent (FR); Isabelle Germaine Claude Ladeveze, Nousty (FR)

(73) Assignee: Turbomeca, Bordes (FR)

( * ) Notice: Subject to any disclaimer, the term of this patent is extended or adjusted under 35 U.S.C. 154(b) by 0 days.

(21) Appl. No.: 13/146,089

(22) PCT Filed: Jan. 14, 2010

(86) PCT No.: PCT/FR2010/050054
§ 371 (c)(1),
(2), (4) Date: Jul. 25, 2011

(87) PCT Pub. No.: WO2010/086536
PCT Pub. Date: Aug. 5, 2010

(65) Prior Publication Data
US 2011/0284318 A1   Nov. 24, 2011

(30) Foreign Application Priority Data
Jan. 27, 2009 (FR) ................... 09 50480

(51) Int. Cl.
*F01N 1/10* (2006.01)
*F01N 1/24* (2006.01)
*F01N 13/08* (2010.01)
*F02K 1/00* (2006.01)
*F02M 35/00* (2006.01)

(52) U.S. Cl. ........ 181/213; 181/229; 181/248; 181/252; 181/256

(58) Field of Classification Search .................. 181/213, 181/229, 248, 252
See application file for complete search history.

(56) References Cited

U.S. PATENT DOCUMENTS
RE22,283 E * 3/1943 Bourne .......... 181/248
3,215,172 A * 11/1965 Ardoin .......... 181/220
(Continued)

FOREIGN PATENT DOCUMENTS
EP    1 010 884    6/2000
(Continued)

OTHER PUBLICATIONS
International Search Report issued Jul. 1, 2010 in PCT/FR10/050054 filed Jan. 14, 2010.

*Primary Examiner* — David Warren
*Assistant Examiner* — Christina Russell
(74) *Attorney, Agent, or Firm* — Oblon, Spivak, McClelland, Maier & Neustadt, L.L.P.

(57) ABSTRACT

The soundproofed exhaust duct for a turbine engine comprises a perforated inner shell defining a flow passage, and a solid outer shell, the inner and outer shells defining between them a space that is closed at the upstream and downstream ends of said space. A core extends between the inner and outer shells at a distance therefrom, and contains at least one sound energy dissipating layer made up of hollow beads that are held against one another. A frame with upstream and downstream portions connected together by longitudinal members supports the core and partitions it into a plurality of boxes that are filled with hollow beads that are held between perforated textures, the frame being secured to the outer shell and/or to the inner shell via at least one of its upstream and downstream portions.

10 Claims, 6 Drawing Sheets

U.S. PATENT DOCUMENTS

| | | | |
|---|---|---|---|
| 3,955,643 A * | 5/1976 | Clark | 181/248 |
| 4,327,142 A * | 4/1982 | Norzi | 428/198 |
| 5,371,331 A * | 12/1994 | Wall | 181/227 |
| 5,670,756 A * | 9/1997 | Ohtaka et al. | 181/256 |
| 5,992,560 A * | 11/1999 | Matsuoka et al. | 181/252 |
| 6,622,818 B2 * | 9/2003 | Jenvey | 181/224 |
| 6,668,972 B2 * | 12/2003 | Huff et al. | 181/256 |
| 6,857,502 B2 * | 2/2005 | Naito | 181/252 |
| 6,868,939 B2 * | 3/2005 | Ziehl | 181/256 |
| 7,810,609 B2 * | 10/2010 | Sikes et al. | 181/250 |
| 2002/0166718 A1 * | 11/2002 | Gadefatt et al. | 181/225 |
| 2004/0050618 A1 * | 3/2004 | Marocco | 181/248 |
| 2004/0076512 A1 * | 4/2004 | Lata Perez | 415/119 |
| 2005/0279571 A1 * | 12/2005 | Marocco | 181/270 |
| 2008/0035418 A1 * | 2/2008 | Marocco | 181/211 |
| 2008/0185216 A1 * | 8/2008 | Baude et al. | 181/229 |
| 2008/0185217 A1 * | 8/2008 | Baude | 181/229 |

FOREIGN PATENT DOCUMENTS

EP     1 391 597     2/2004

* cited by examiner

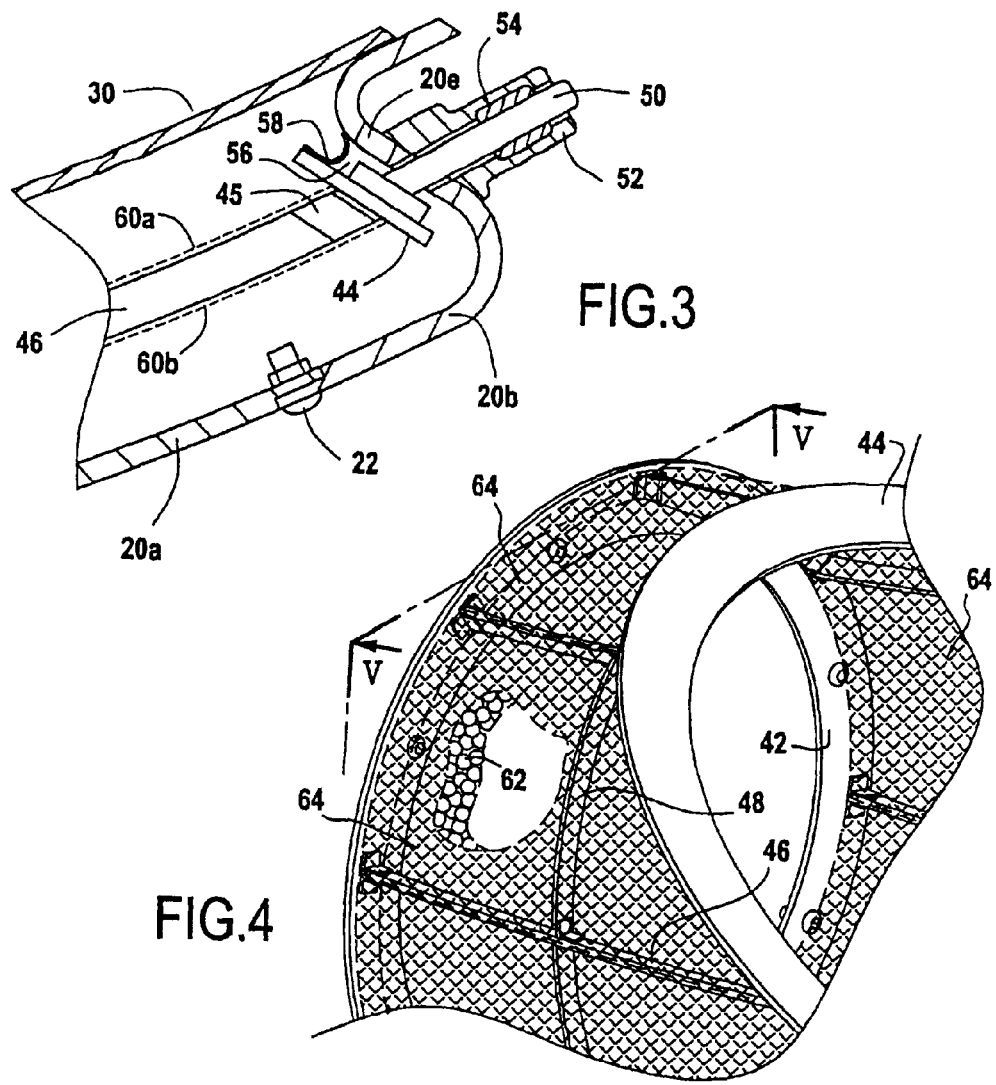
FIG.3
FIG.4
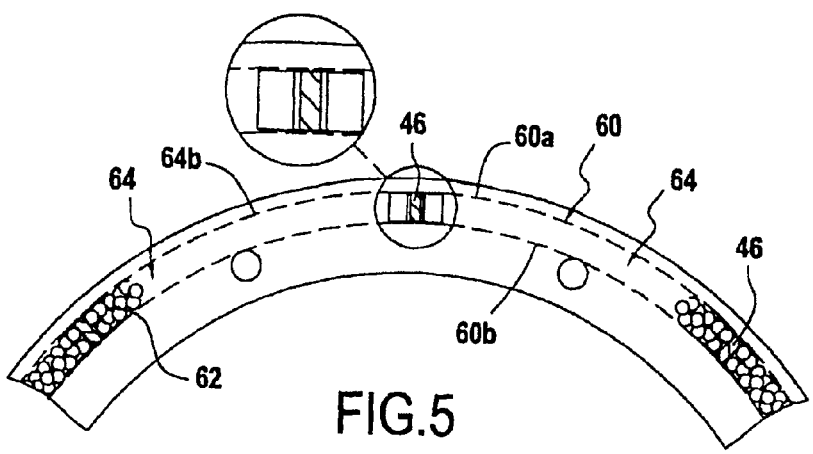
FIG.5

SOUNDPROOF EXHAUST PIPE FOR A TURBINE ENGINE

BACKGROUND OF THE INVENTION

The invention relates to a soundproofed exhaust duct for a turbine engine. A particular field of application of the invention is that of processing the sound from a gas turbine engine exhaust, in particular for a helicopter.

The progress that has been made in reducing the noise that is generated by the rotation of the rotor blades of a helicopter means that the noise from the turbine driving the blades is becoming a substantial component of the total amount of sound emitted.

It is therefore desirable to reduce noise from the turbine.

To this end, Document EP 1 010 884 proposes providing the walls of a multichannel exhaust nozzle of a helicopter turbine with a sound energy absorbing coating. The coating is relatively thick, given the sound frequencies concerned, thereby giving rise to problems of weight and of bulk.

OBJECT AND A SUMMARY OF THE INVENTION

An object of the invention is to propose a soundproofed exhaust duct for a turbine engine that provides effective soundproofing while having a structure that is relatively light.

This object is achieved by means of an exhaust duct comprising:
- a perforated inner shell defining a flow passage of the exhaust duct;
- a solid outer shell, the inner and outer shells defining between them a space that is closed at the upstream and downstream ends of said space;
- a core extending between the inner and outer shells, at a distance therefrom, and containing at least one sound energy dissipating layer made up of hollow beads that are held against one another; and
- a frame having upstream and downstream portions that are connected together by longitudinal members, the frame supporting the core and partitioning it into a plurality of boxes that are filled with hollow beads held between two perforated textures;
- the frame being secured to at least one of the outer shell and inner shell via at least one of the upstream and downstream portions of the frame.

The terms "upstream" and "downstream" are used herein relative to the flow direction of the gas stream in the exhaust duct.

The frame serves to hold a core, between the inner and outer shells, which core contains at least one layer of hollow beads that, in known manner, produce a large amount of sound energy dissipation. Effective soundproofing is thus obtained with a lightweight structure. Advantageously, the hollow beads used are ceramic beads with a microperforated porous wall.

In an embodiment, the outer shell constitutes a structural part that has its upstream end portion secured to the upstream portion of the frame, and the latter has its downstream portion free to move longitudinally relative to the outer shell. The structural function of the exhaust duct is then performed by the outer shell. Differential dimensional variations of thermal origin between the outer shell and the frame are accommodated by the fact that the frame is free to move longitudinally at its downstream end.

Advantageously, in its downstream portion, the frame then carries a longitudinally-projecting finger capable of sliding in a guide that is secured to the outer shell. Furthermore, a flexible sealing lip is interposed in a gap between the downstream portions of the frame and of the outer shell, thereby avoiding propagation of noise.

In another embodiment, the frame constitutes a structural part carrying the inner shell and the outer shell. The structural function of the exhaust duct is then performed by the frame.

Under such circumstances, the outer shell preferably comprises segments that extend one another, an upstream first segment being connected to the upstream portion of the frame, and a downstream segment being connected to the downstream portion of the frame. This allows dimensional variations of thermal origin to take place between the outer shell and the frame.

Advantageously, in either embodiment, the inner shell is secured at its upstream or downstream end to the upstream or downstream end of the frame, and is free relative to the frame at its other end, thus accommodating dimensional variations between the inner shell and the frame.

Still in either embodiment, at least one solid partition may be provided that extends transversely in each of the spaces between the core and the inner and outer shells, thereby avoiding noise propagating longitudinally in these spaces. Advantageously, each partition extends from the inner or outer shell to which it is fastened to the proximity of the core, without making contact with the core.

BRIEF DESCRIPTION OF THE DRAWINGS

The invention can be better understood on reading the following description made by way of nonlimiting indication with reference to the accompanying drawings, in which:

FIG. 3 is a view on a larger scale of a detail of FIG. 1;

FIG. 4 is a view showing in particular a portion of the sound energy dissipating core supported and partitioned by the frame of FIG. 2;

FIG. 5 is a fragmentary cross-section view on plane V-V of FIG. 4;

DETAILED DESCRIPTION OF EMBODIMENTS

Figure 1:
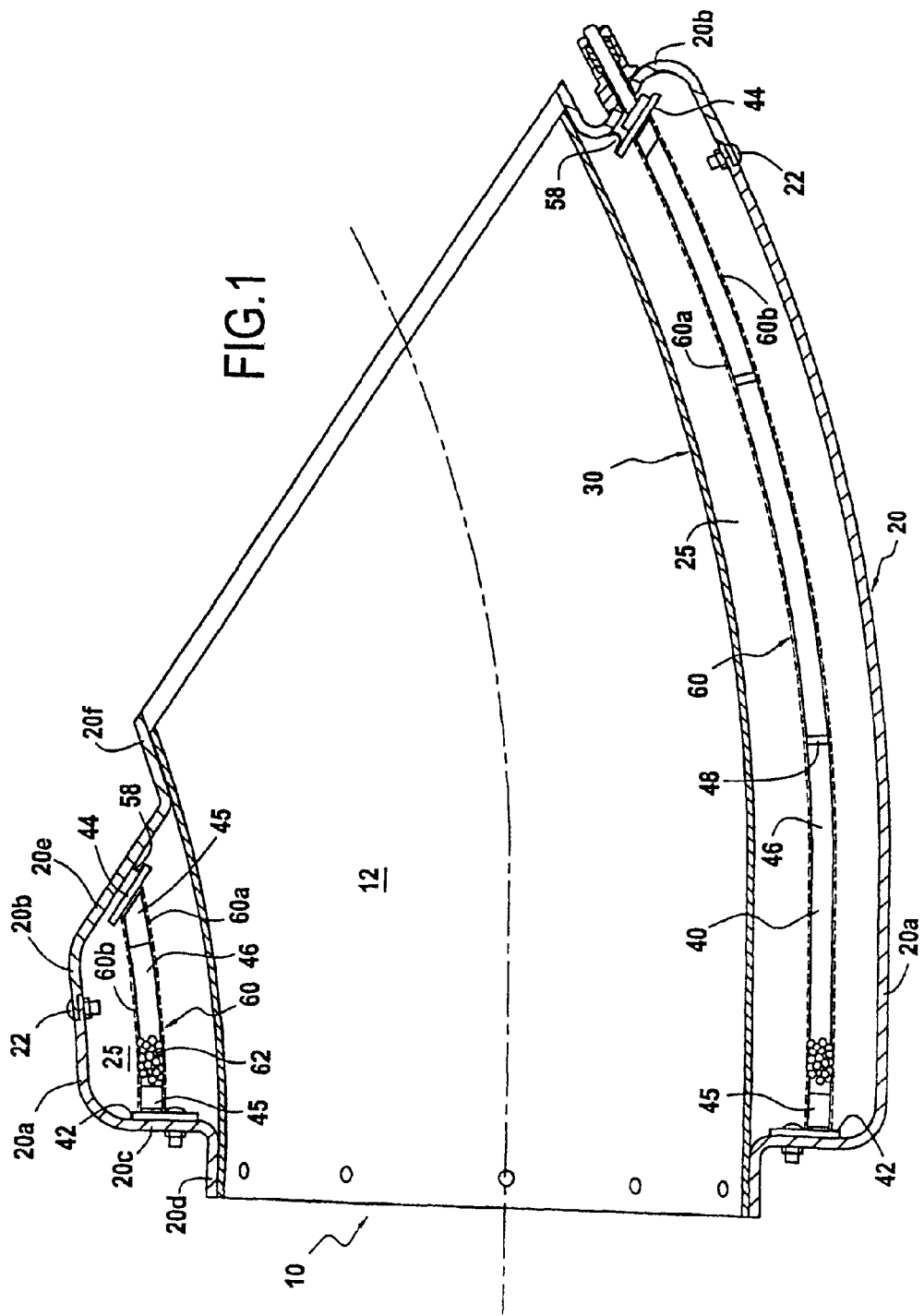
FIG. 1 is a diagrammatic longitudinal section view of a soundproofed exhaust duct in an embodiment of the invention.
Figure 2:
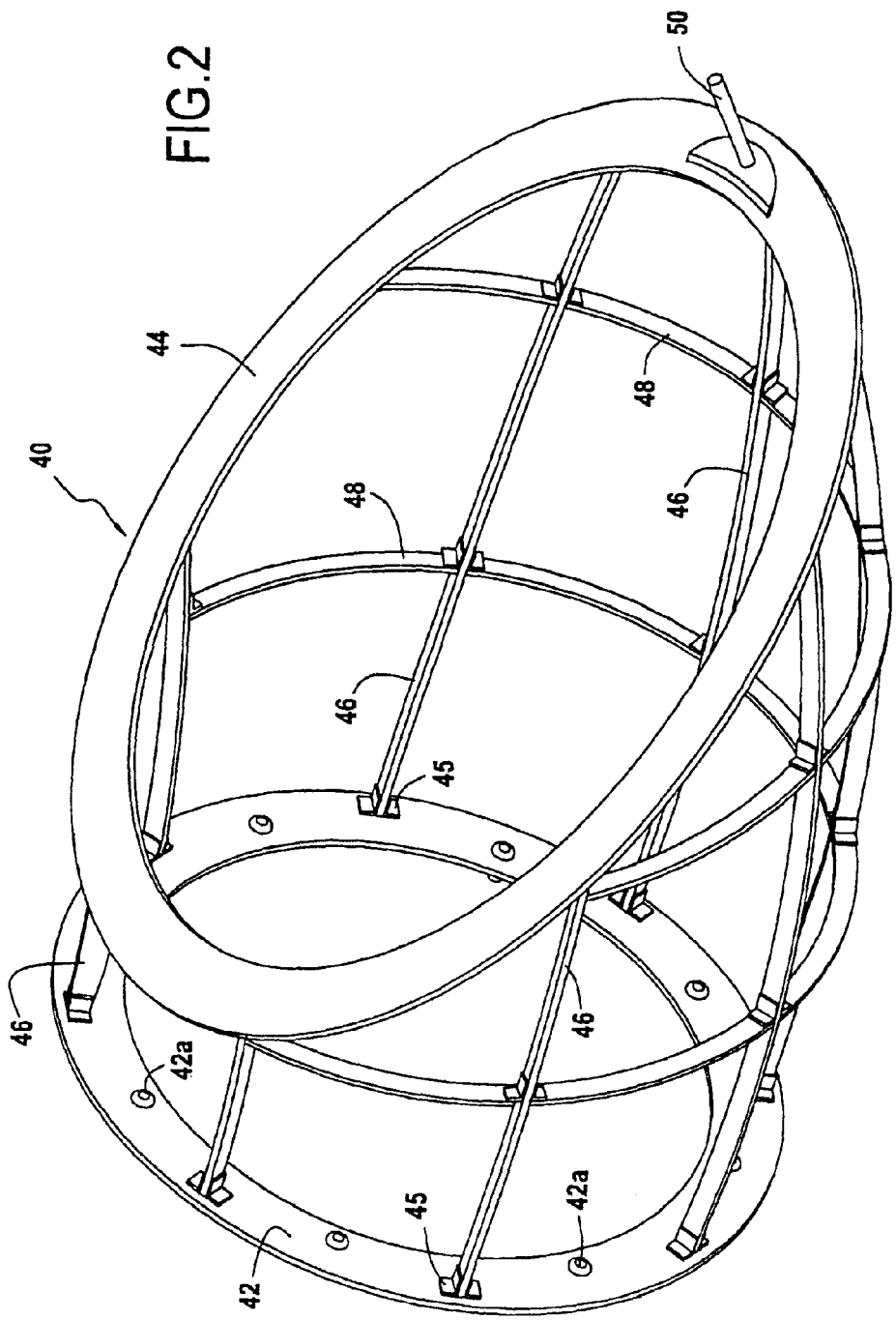
FIG. 2 is a diagrammatic perspective view of the frame of the FIG. 1 soundproofed duct.

A first embodiment of a soundproofed exhaust duct 10 of the invention is described with reference to FIGS. 1 to 5. The exhaust duct 10 shown is a nozzle of a gas turbine engine for a helicopter, and in known manner it presents a curved shape so as to ensure that the gas coming from the turbine is diverted in a direction away from the tail of the helicopter.

The duct 10 comprises a solid outer shell 20, a perforated inner shell 30 defining an exhaust passage 12 and spaced apart from the outer shell 20, a frame 40, and a sound energy dissipating core 60 that is supported and partitioned by the frame 40.

In this embodiment, the outer shell 20 performs the structural function of the exhaust duct. It may be made using metal sheet, for example using a nickel alloy, or it may be obtained by superplastic forming of a refractory titanium alloy. The shell 20 is made of two portions so as to enable the exhaust duct to be assembled: an upstream portion 20a and a downstream portion 20b that are fastened together, e.g. by bolting or by screw-and-nut assemblies 22.

The inner shell 30 is permeable to sound waves. It may be made in the form of a perforated metal sheet, e.g. using a refractory nickel alloy. Holes, e.g. having a diameter in the range 1 millimeter (mm) to a few millimeters, are formed through the shell 30 over its entire length and periphery so as to pass soundwaves that are reflected by the outer shell 20 after passing through the core 60. The perforation ratio of the shell 30 may lie in the range 10% to 30%, for example.

At its upstream end, the outer shell 20 is folded so as to form a radial portion 20c on which the downstream portion of the frame is mounted, as described below, the radial portion 20c being extended by an upstream terminal portion 20d that is pressed against the upstream terminal portion of the inner shell 30.

The upstream terminal portions of the shells 20 and 30 are connected to each other and to an adjacent portion (not shown) of a casing of the engine, the connection being made by screws or by bolts, for example.

At its downstream end, the outer shell 20 is also folded to form a transverse portion 20e that is extended by a downstream terminal portion 20f pressed against the downstream terminal portion of the inner shell 30.

Thus, the space 25 between the outer and inner shells 20 and 30 is closed by solid walls that are impermeable to soundwaves at the upstream and downstream ends of this space.

It should be observed that the inner shell 30 is secured to the outer shell 20 solely via its upstream portion, thereby allowing the downstream terminal portions of the shells 20 and 30 to slide relative to each other as a result of differential expansion of thermal origin, the inner shell 30 being exposed to the gas coming from the turbine. In a variant, the shell 30 may be fastened to the outer shell solely at its downstream portion, while leaving the possibility of sliding at the upstream end.

The frame 40 (FIGS. 1 and 2) comprises an upstream portion, e.g. in the form of a radial ring 42, a downstream portion, e.g. in the form of a ring 44, and longitudinal members 46 connecting together the rings 42 and 44, possibly also with radial spacers 48 extending between the longitudinal members so as to have a frame that is rigid. At their upstream and downstream ends, the longitudinal members 46 are fastened to the upstream and downstream rings 42 and 44 by means of tabs 45, the fastening being performed by bolting, screw fastening, or welding, for example. At their ends, the spacers 48 are fastened in similar manner to the longitudinal members between which they extend. The frame may be made of a refractory metal material, e.g. a nickel alloy or titanium.

The frame 40 is fastened to the upstream end of the outer shell 20 by the upstream ring 42 bearing against the inside face of the radial portion 20c of the shell 20 and by screw-and-nut connections, the screws 42a having their heads brazed onto the inside face of the ring 42 or being held against said inside face by covers that are brazed or welded thereto.

At its downstream end, the frame 40 is free to accommodate movements due to differential expansion between the frame 40 and the outer shell 20. Advantageously, at its downstream end, the frame 40 carries a finger 50 that projects downstream from the downstream ring 44, e.g. in line with a longitudinal member 46. As shown in greater detail in FIG. 3, the finger 50 passes through the outer shell in its transverse portion 20e and passes into a guide 52 that is fastened on the outside of said transverse portion 20e. A metal bearing 54 may be inserted in the guide 52 to facilitate sliding of the finger 50 during the movements due to differential expansion. Engagement of the finger 50 in the guide 52 also serves to lock the frame 40 against rotation relative to the outer shell 20.

In order to accommodate the possibility of differential expansion, a space 56 is left between the downstream ring 44 of the frame 42 and the transverse portion 20e at the downstream end of the outer shell 20. A flexible annular lip 58 is inserted in this space, being fastened, e.g. welded, to the outside face of the downstream ring 44 (or the inside face of the portion 20e of the shell 20) and bearing against the inside face of the portion 20e of the shell 20 (or against the outside face of the downstream ring 44). By way of example, the lip 58 is made of thin metal sheet and provides soundproofing to avoid soundwaves passing between the shells 30 and 20 away from the core 60.

The core 60 dissipates sound energy by means of a layer of hollow beads 62 that are held between two opposite perforated walls 60a and 60b of the core 60, the walls 60a and 60b being made in the form of grids, lattices, or metal nets, for example. Only some of the beads 62 are shown in FIG. 1. The beads 62 are preferably hollow ceramic beads with a microperforated porous wall, having a mean diameter lying in the range 1 mm to a few millimeters, for example. The use of a layer or bed of such beads in a core of a soundproofing panel, in the space between a perforated wall and a solid wall, is itself known. Reference may be made in particular to Documents FR 98/02346 and FR 03/13640.

The core 60 is supported and partitioned by the frame 40, the core being subdivided into boxes 64 by the rings 42 and 44, the longitudinal members 46, and the spacers 48, as can be seen in FIG. 4 (in order to clarify the drawing, only some of the boxes are shown in FIG. 4). The perforated wall 60a situated on the inside of the core may be a grid, a lattice, or a net made as a single piece and fastened to the inside edges of the longitudinal members 46 and the spacers 48, e.g. by micro spot welding. The perforated wall 60b situated on the outside is subdivided into individual grid, lattice, or net elements 64b for each box 64.

In order to fill each box 64, after the perforated wall 60a has been put into place and fastened, the perforated wall element 64b is fastened in part to the inside edges of the longitudinal members and of the spacers defining the box 64, e.g. by micro spot welds. The box is then filled with beads 62 to occupy a maximum amount of space in the box. The beads are kept packed against one another while finishing off the fastening of the perforated wall element 64b. The boxes are advantageously filled while elastically deforming the perforated walls surrounding them, thereby maintaining pressure on the beads 62 and conserving close contact between the beads in the event of thermal expansion of the boxes. For best dissipation of sound energy, it is indeed desirable to maintain such contact between the beads so as to prevent soundwaves going past them. Since the absolute value of expansion to which the box is subjected is a function of its dimensions, a compromise is sought between limiting the size of the boxes and limiting the weight of the frame (and thus the number of longitudinal members and spacers). As an indication, the boxes may present an area lying in the range 100 square centimeters ($cm^2$) to 400 $cm^2$.

Figure 6:
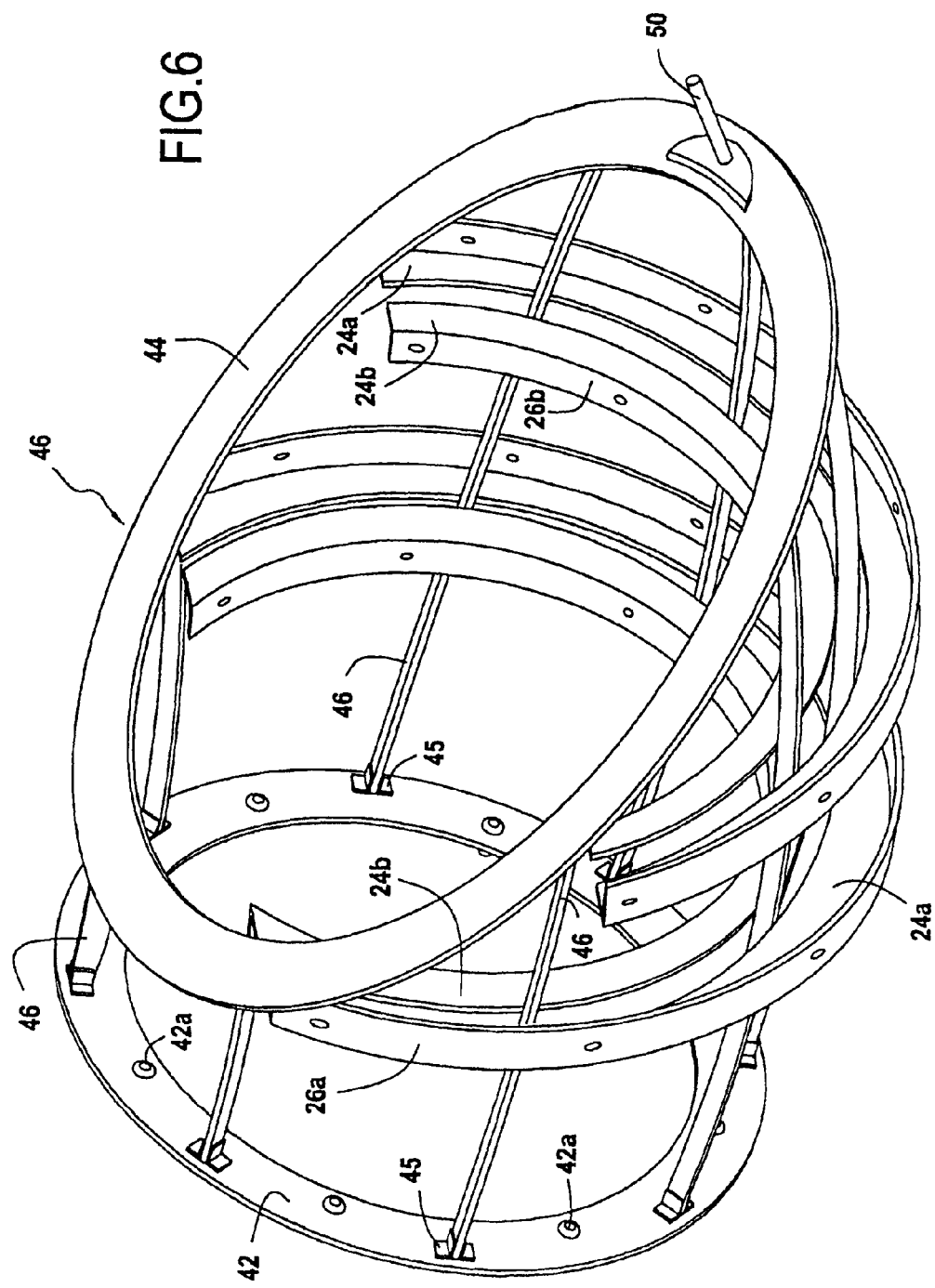
FIG. 6 is a diagrammatic perspective view of a variant embodiment of the soundproofed duct frame of FIG. 1.

As shown in FIG. 6, radial or substantially radial partitions may be arranged in the space 25 between the outer and inner shells 20 and 30 so as to oppose soundwaves being transmitted longitudinally in this space.

The partitions may extend all around the longitudinal axis of the exhaust duct, or as shown, over only a sector around said axis, depending on the space available.

Each partition comprises two portions, an outer portion 24a extending between the core 60 and the outer shell 20, and an inner portion 24b extending between the core 60 and the inner shell 30, thereby leaving a gap for passing the frame 40 with a small amount of clearance. The portions 24a and 24b are solid, i.e. they are not perforated, and they are made of metal, preferably out of the same metal as the metal constituting the frame 40.

Each outer portion 24a of a partition presents an outer rim 26a for fastening to the outer shell 20, while each inner portion 24b of a partition presents an inner rim 26b for fastening to the inner shell 30, where fastening may be obtained, for example, by bolting, screw-fastening, welding, brazing, or adhesive.

Figure 7:
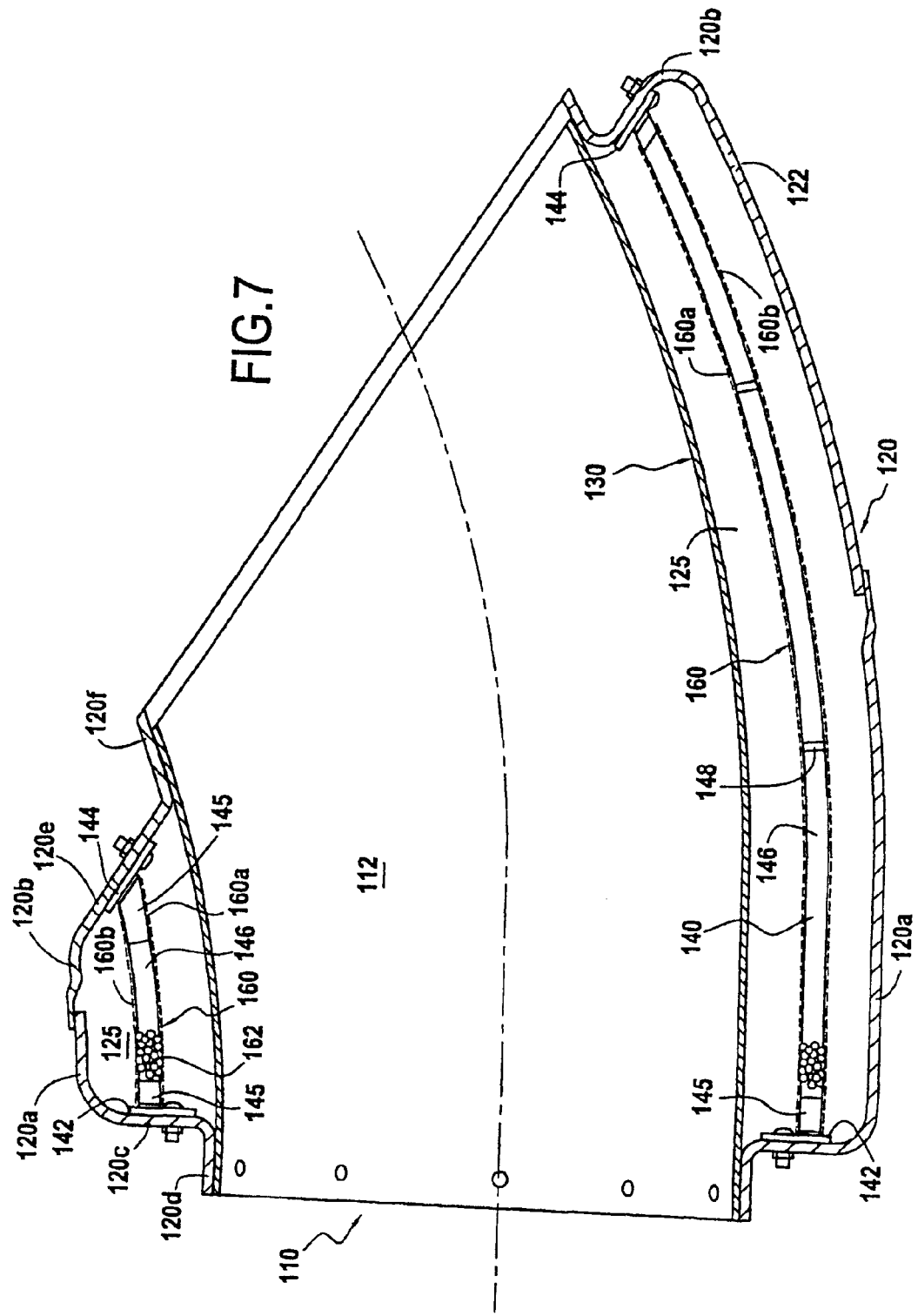
FIG. 7 is a diagrammatic view in longitudinal section of a soundproofed exhaust duct of another embodiment of the invention.

FIG. 7 is a diagram showing a second embodiment of an exhaust duct 110 of the invention. The components of the second embodiment that are similar to those of the first embodiment have the same reference number plus 100.

The duct 110 comprises a solid outer shell 120, a perforated inner shell 130 defining an exhaust passage 112 and spaced apart from the outer shell 120, a frame 140, and a sound energy dissipating core 160 that is supported and partitioned by the frame 140.

Figure 8:
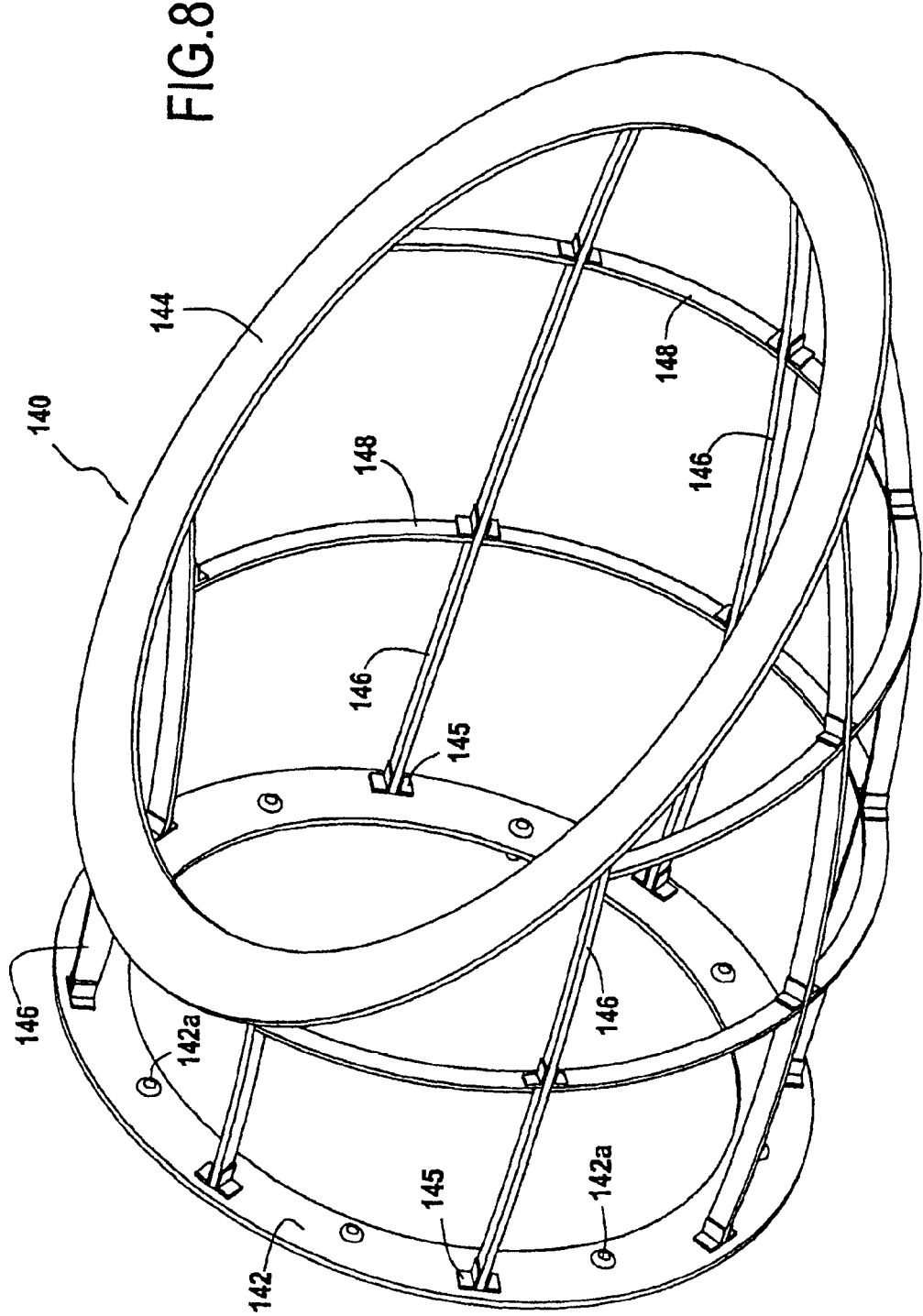
FIG. 8 is a diagrammatic perspective view of the frame of the soundproofed duct of FIG. 7.

This second embodiment differs from that described above in that the structural function of the exhaust duct 110 is performed by the frame 140. The frame 140 is preferably made of a refractory metallic material, e.g. an alloy of nickel or titanium. In similar manner to the frame 40 of FIGS. 1 and 2, the frame 140 (FIGS. 7 and 8) has upstream and downstream rings 142 and 144 that are connected together by longitudinal members 146 that are themselves connected together by spacers 148, and the component portions of the frame are dimensioned so as to impart the desired structural role thereto.

The outer shell 120 comprises two portions, an upstream portion 120a and a downstream portion 120b. At its upstream end, the portion 120a is folded to form a radial portion 120c that is extended by an upstream terminal portion 120d that is pressed against the upstream terminal portion of the inner shell 130. At its downstream end, the portion 120b is folded to form a transverse portion 120e that is extended by a downstream terminal portion 120f that is pressed against the downstream terminal portion of the inner shell 130. The space 125 between the outer and inner shells 120 and 130 is thus closed at its upstream and downstream ends by solid walls that are impermeable to soundwaves.

The upstream portion 120a of the outer shell 120 is secured to the frame 140 by connection between the upstream ring 142 of the frame and the radial portion 120c. The downstream portion 120b of the outer shell 120 is secured to the frame 140 by connection between the downstream ring 144 of the frame and the transverse portion 120e. By way of example, the connections may be made by screws and nuts, the screws having their heads brazed to the inside faces of the rings 142 and 144, or being held against these faces by covers that are brazed or welded thereto. In a variant, the upstream and/or downstream rings 142 and/or 144 may be constituted by the radial portion 120c and/or the transverse portion 120e of the shell 120, the longitudinal members 146 then being fastened to the radial portion 120c and/or to the transverse portion 120e.

The downstream end of the upstream portion 120a and the upstream end of the downstream portion 120b are connected together with mutual overlap in order to accommodate relative sliding under the effect of differential expansion between the frame 140 and the outer shell 120.

The upstream terminal portions of the shells 120 and 130 are connected to each other and to an adjacent portion (not shown) of a casing of the engine, with the connection being made of example by screw fastening or by bolting. The shell 130 is secured to the outer shell 120 solely via its upstream portion so as to accommodate relative sliding between the downstream terminal portions of the shells 120 and 130 as a result of differential expansion of thermal origin. In a variant, the inner shell 130 may be fastened to the outer shell solely via its downstream portion, leaving the possibility for sliding at its upstream portion.

Sound energy is dissipated by the core 160 by means of a layer of hollow beads 162 held between two perforated walls 160a and 160b, e.g. grids, lattices, or metal nets. The core 160 is subdivided by the frame 140 into boxes that are filled with beads 162, in the same manner as the above-described core 60.

It should be observed that radial or substantially radial partitions may be arranged in the space 125 in order to oppose soundwaves being transmitted longitudinally in the space 125, in the same manner as shown in FIG. 6.

While the engine is in operation, soundwaves penetrate into the space 25 or 125 through the inner shell 30 or 130, and pass several times through the core 60 or 160, being reflected by the outer shell 20 or 120. A significant fraction of the sound energy is dissipated on each passage through the layer of beads in the core.

As an indication, using beads 62 or 162 having a mean diameter of 1 mm to a few millimeters, e.g. lying in the range 1 mm to 3.5 mm, effective sound attenuation at the dominant sound wavelengths produced by the turbine is achieved with a core thickness lying in the range approximately 5 mm to 20 mm. The total thickness of the wall of the exhaust duct (the distance between the outer and inner shells) may then lie in the range approximately 50 mm to 200 mm.

In the above-described embodiments, only one core 60 or 160 is provided. In a variant, it would be possible to have a plurality of cores that are spaced apart from one another and from the outer and inner shells 20 or 120 and 30 or 130, with the frame 40 or 140 then being made with a plurality of corresponding assemblies of longitudinal members and spacers in order to support and partition the cores.

The invention claimed is:

1. A soundproofed exhaust duct for a turbomachine, the duct comprising:
   a perforated inner shell defining a flow passage of the exhaust duct;
   a solid outer shell, the inner and outer shells defining therebetween a space that is closed at upstream and downstream ends of said space;
   a core containing at least one sound energy dissipating layer made up of hollow beads that are held against one another between opposite perforated walls distinct and extending at a distance from the inner shell and the outer shell; and
   a frame distinct from said inner and outer shells, having upstream and downstream portions that are connected together by longitudinal members, the frame supporting the core and partitioning the core into a plurality of boxes that are filled with the hollow beads held between the two perforated walls,
   wherein the frame is secured to at least one of the outer shell and inner shell via at least one of the upstream and downstream portions of the frame.

2. A duct as claimed in claim 1, wherein the outer shell constitutes a structural part that has its upstream end portion secured to the upstream portion of the frame, the frame having its downstream portion free to move longitudinally relative to the outer shell.

3. A duct as claimed in claim 2, wherein, in its downstream portion, the frame carries a longitudinally-projecting finger capable of sliding in a guide that is secured to the outer shell.

4. A duct as claimed in claim 2, wherein a flexible sealing lip is interposed in a gap between the downstream portions of the frame and of the outer shell.

5. A duct as claimed in claim 1, wherein the frame constitutes a structural part carrying the inner shell and the outer shell.

6. A duct as claimed in claim 5, wherein the outer shell comprises segments that extend one another, an upstream first segment being connected to the upstream portion of the frame, and a downstream segment being connected to the downstream portion of the frame.

7. A duct as claimed in claim 1, wherein the inner shell is secured at its upstream or downstream end to the upstream or downstream end of the outer shell and is free relative to the outer shell at its other end.

8. A duct as claimed in claim 1, wherein at least one solid partition extends transversely in each of the spaces between the core and the inner and outer shells.

9. A duct as claimed in claim 8, wherein each partition extends from the inner or outer shell to which it is fastened to the proximity of the core, without making contact with the core.

10. A duct as claimed in claim 1, wherein the hollow beads are ceramic beads with a microperforated porous wall.

\* \* \* \* \*